US 8,743,021 B1

United States Patent
Park et al.

(10) Patent No.: US 8,743,021 B1
(45) Date of Patent: Jun. 3, 2014

(54) DISPLAY DEVICE DETECTING GAZE LOCATION AND METHOD FOR CONTROLLING THEREOF

(71) Applicant: LG Electronics Inc., Seoul (KR)

(72) Inventors: Hyorim Park, Seoul (KR); Doyoung Lee, Seoul (KR); Yongsin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/949,787

(22) Filed: Jul. 24, 2013

Related U.S. Application Data

(60) Provisional application No. 61/803,792, filed on Mar. 21, 2013.

(30) Foreign Application Priority Data

May 31, 2013 (KR) ................. 10-2013-0062910

(51) Int. Cl.
*G09G 5/00* (2006.01)
(52) U.S. Cl.
USPC ............. 345/1.1; 345/1.3; 345/156; 345/158; 715/776
(58) Field of Classification Search
USPC .................. 345/156–162, 184, 1.1–2.2, 7–9; 715/776
See application file for complete search history.

(56) References Cited

U.S. PATENT DOCUMENTS

| 5,850,211 | A | * | 12/1998 | Tognazzini | 345/158 |
| 6,956,591 | B2 | * | 10/2005 | Lundin et al. | 345/684 |
| 2003/0038754 | A1 | | 2/2003 | Goldstein et al. | |
| 2005/0246619 | A1 | | 11/2005 | Krause | |
| 2010/0169825 | A1 | * | 7/2010 | Krause | 715/784 |
| 2011/0006978 | A1 | | 1/2011 | Yuan | |
| 2011/0249042 | A1 | * | 10/2011 | Yamamoto et al. | 345/690 |
| 2011/0298826 | A1 | * | 12/2011 | Namba | 345/635 |
| 2012/0131491 | A1 | * | 5/2012 | Lee | 715/776 |
| 2012/0256967 | A1 | * | 10/2012 | Baldwin et al. | 345/684 |
| 2012/0293528 | A1 | * | 11/2012 | Larsen | 345/589 |
| 2013/0021373 | A1 | * | 1/2013 | Vaught et al. | 345/633 |
| 2013/0027302 | A1 | | 1/2013 | Iwaizumi et al. | |
| 2013/0135196 | A1 | * | 5/2013 | Park et al. | 345/156 |

* cited by examiner

*Primary Examiner* — Gregory J Tryder
(74) *Attorney, Agent, or Firm* — Birch, Stewart, Kolasch & Birch, LLP

(57) ABSTRACT

The present specification relates to a display device detecting a gaze location and a method of controlling therefor, and more particularly, to a method of displaying a reading interface based on a gaze location of a user and displaying content. According to one embodiment, a display device includes a display unit configured to display content, the display unit including a first display area and a second display area, an image capturing unit configured to capture a front image of the display device, and a processor configured to control the display unit and the image capturing unit and configured to detect a gaze location of a user located at a front of the display device from the captured image.

17 Claims, 16 Drawing Sheets

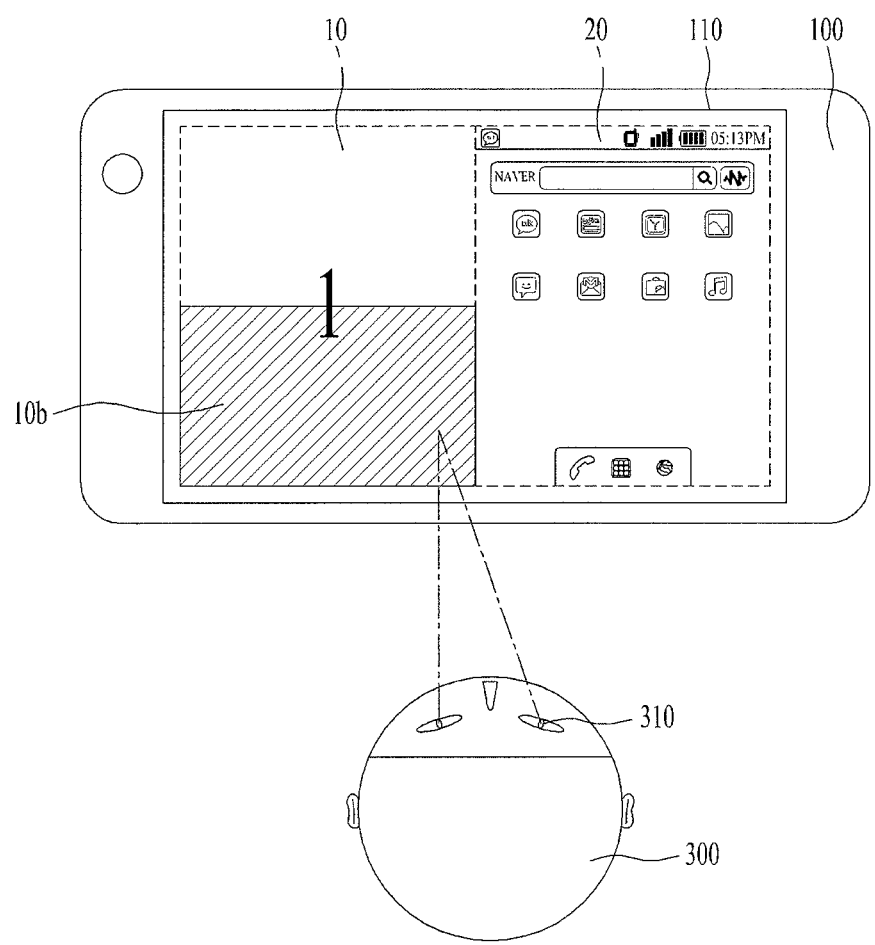

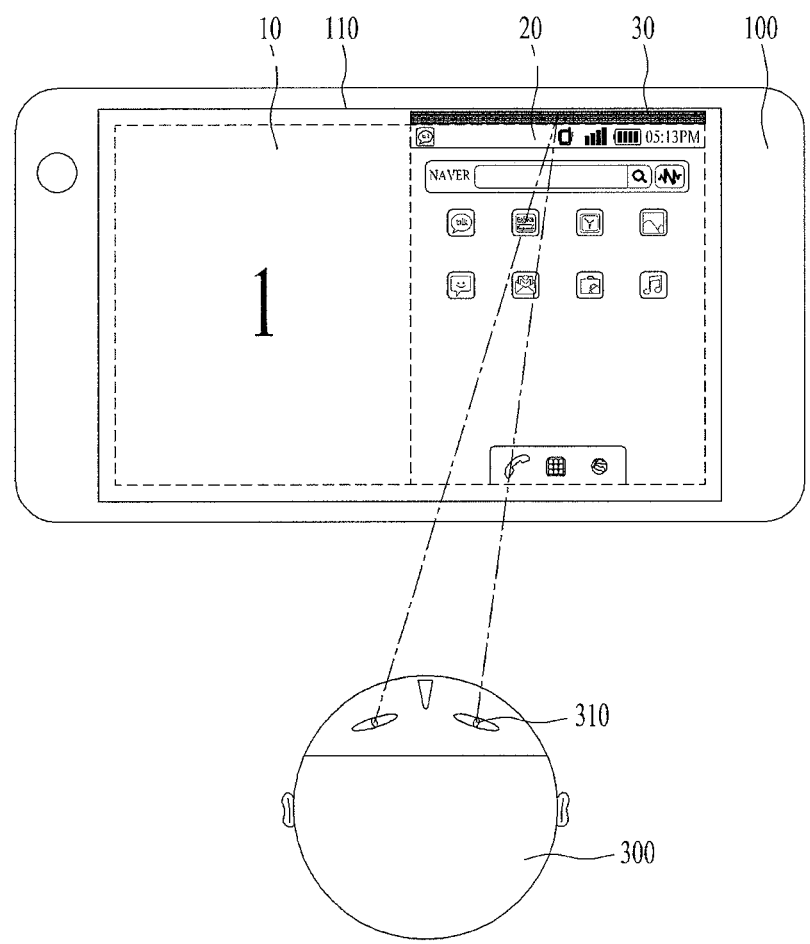

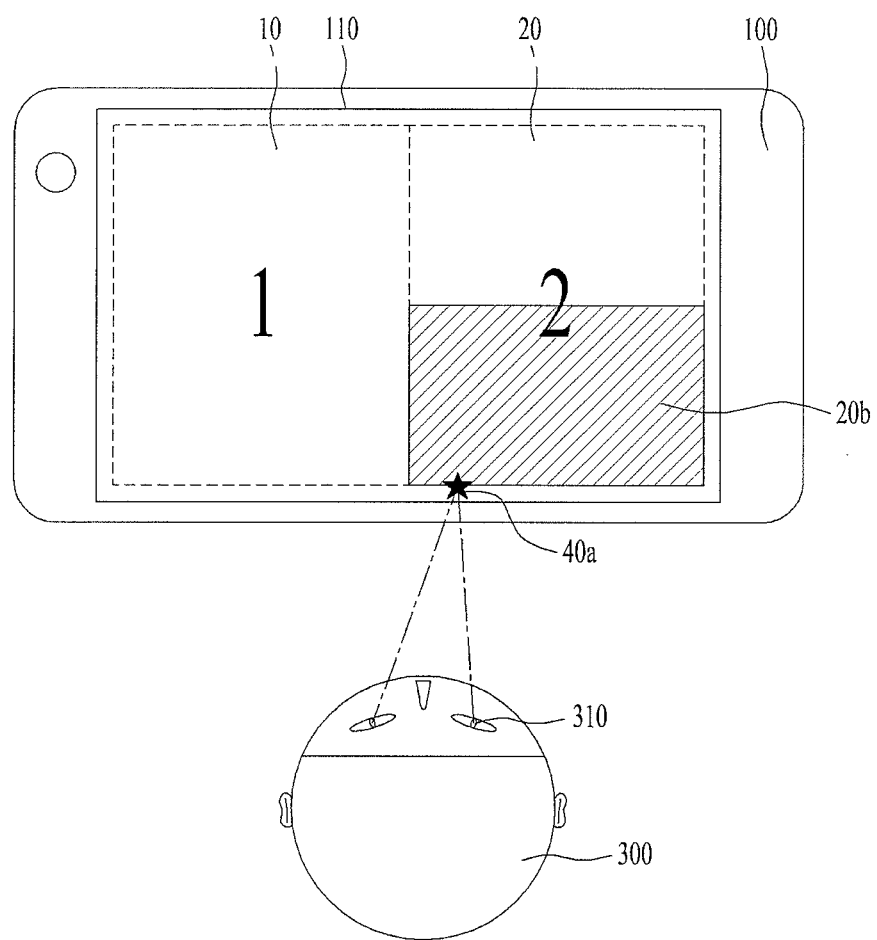

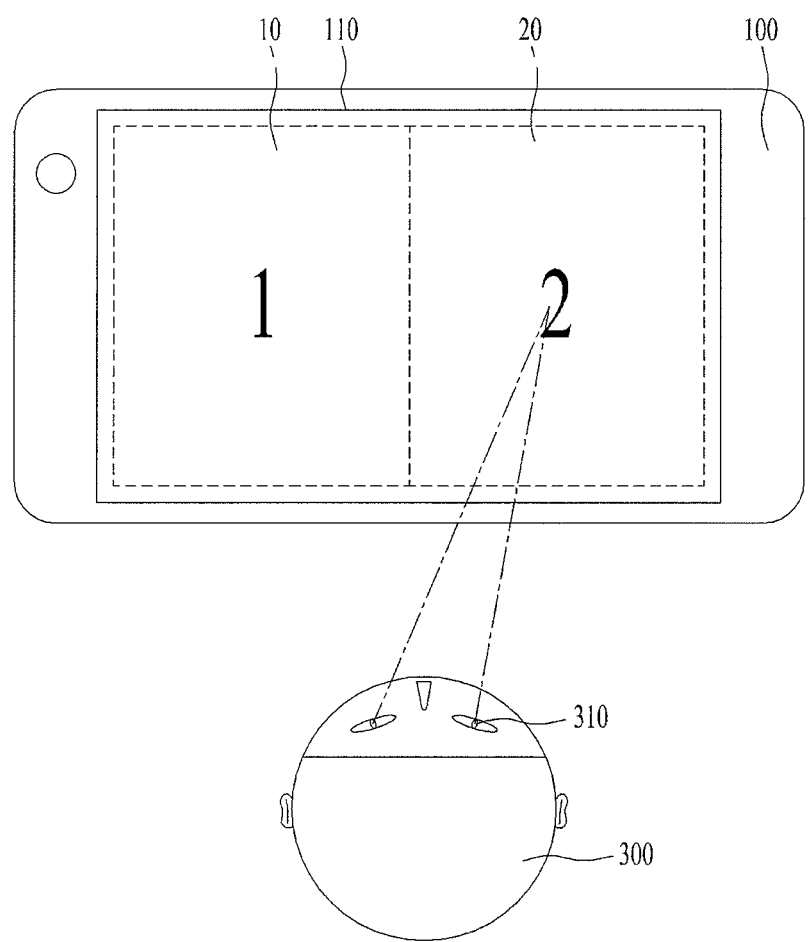

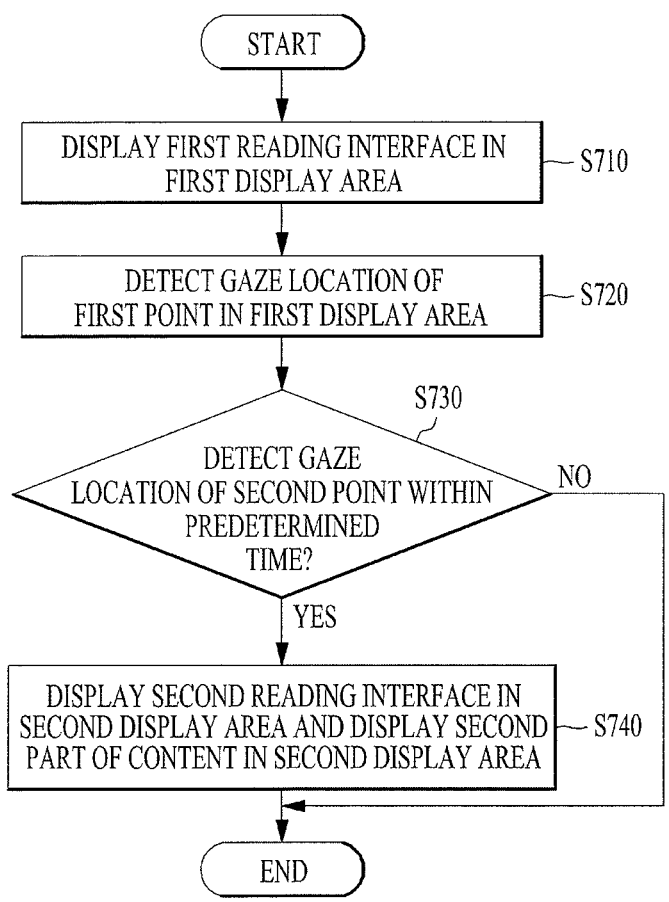

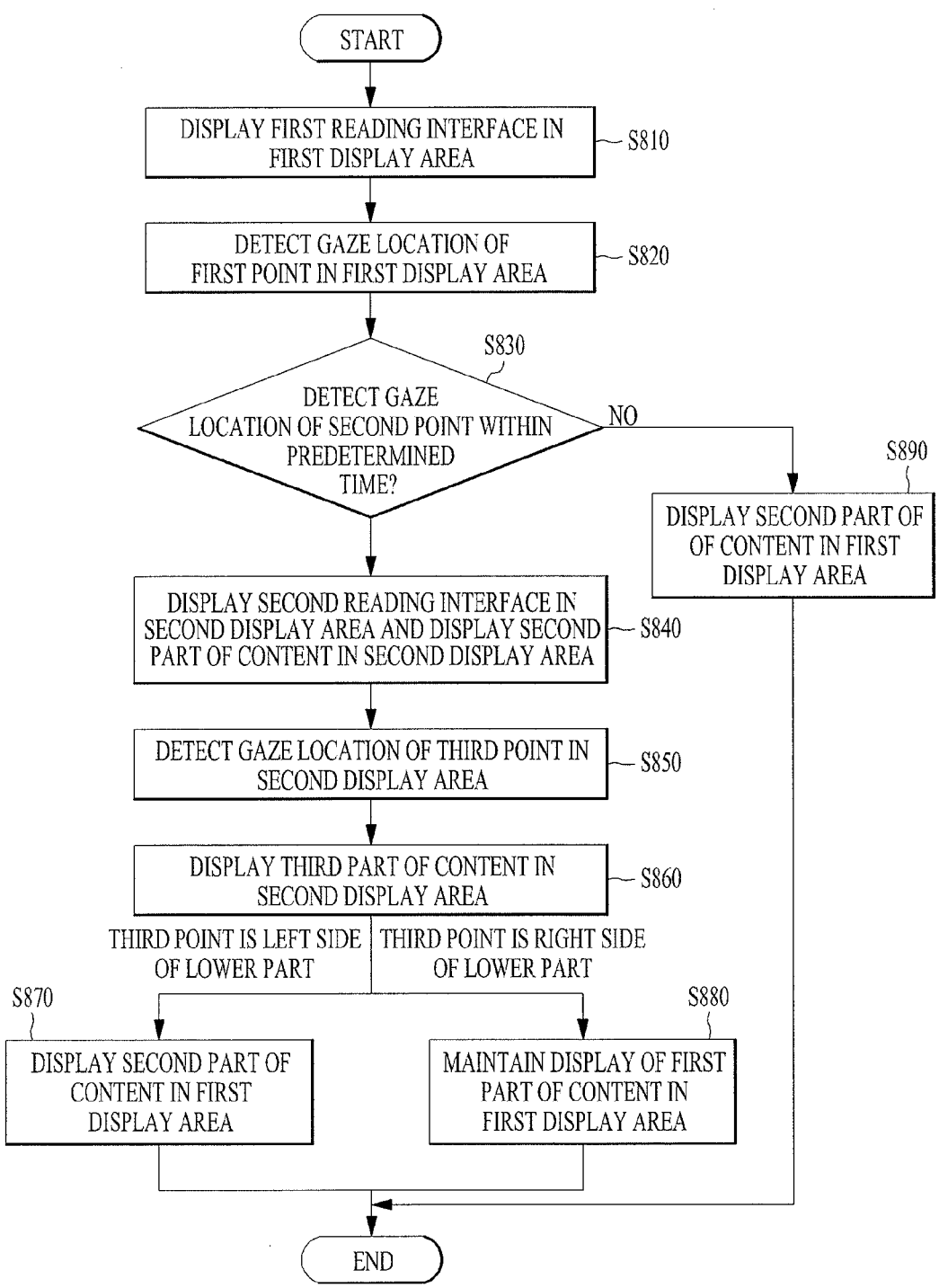

DISPLAY DEVICE DETECTING GAZE LOCATION AND METHOD FOR CONTROLLING THEREOF

This application claims the benefit of the U.S. Provisional Patent Application No. 61/803,792 filed on Mar. 21, 2013 and the Korean Patent Application No.: 10-2013-0062910 filed on May 31, 2013, which are all hereby incorporated by reference as if fully set forth herein.

BACKGROUND OF THE INVENTION

1. Field of the Invention

The present specification relates to a display device detecting a gaze location and a method of controlling therefor, and more particularly, to a method of displaying a reading interface based on a gaze location of a user and displaying content.

2. Discussion of the Related Art

As technologies develop, a function of a display device has been diversified. For instance, in case of a display device, development of a mobile communication network, increase of radio contents, advancement of a processor and a memory installed to the device enabled the display device to perform such a complex function as playing a music or a video file, image taking, playing a game, receiving a TV or radio broadcasting, and the like. Subsequently, the display device enabled a user to use various information without limiting of time and place.

Meanwhile, as the function of a display device is diversified, a method of inputting for the display device is diversified as well. A touch input using software arranged in a display area of the display device as well as an input using a hardware key arranged in the display device is enabled. And, it is enabled for the display device to detect a gesture input and a voice input. Besides, contents can be used in a manner that the display device equipped with a camera detects a movement of pupils of a user or a face direction of the user.

SUMMARY OF THE INVENTION

According to one embodiment, one object of the present specification is to display content in a display area based on a detected gaze location of a user.

Another object of the present specification is to execute content identical to the content, which is currently executed in a part of a plurality of display areas, in a different area where no content is executed in a manner of recognizing a gaze location.

Another object of the present specification is to provide a previous part or a following part of content in a manner that a display device detects a gaze location of a user when the content is displayed in a plurality of display areas.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present specification, as embodied and broadly described, according to one embodiment a display device includes a display unit configured to display content, the display unit comprising a first display area and a second display area, an image capturing unit configured to capture a front image of the display device, and a processor configured to control the display unit and the image capturing unit and detect a gaze location of a user located at a front of the display device from the captured image, wherein the processor is further configured to: display a first reading interface in the first display area, wherein the first reading interface displays a first part of the content, detect a gaze location of a first point in the first display area, display a second reading interface in the second display area and display a second part of the content in the second display area when a gaze location of a second point in the second display area is detected within a predetermined time after the gaze location of the first point is detected.

To further achieve these and other advantages and in accordance with the purpose of the present specification, according to one embodiment a method of controlling a display device includes the steps of: displaying a first reading interface in a first display area wherein the first reading interface displays a first part of content; detecting a gaze location of a first point in the first display area; and displaying a second reading interface in a second display area and displaying a second part of the content in the second display area when a gaze location of a second point is detected within a predetermined time after the gaze location of the first point is detected.

Accordingly, the present specification provides the following effects and/or advantages.

According to one embodiment, a user can easily perform a content conversion or a scrolling only with the movement of eyes of the user to use contents displayed in a display device without an input requiring such a separate operation as a touch input or a gesture input.

And, according to one embodiment, while displaying content only in a part of a plurality of display areas, a display device can display content identical to the content in a rest of a plurality of the display areas as well only with a detected gaze location of a user.

And, according to one embodiment, a user can easily use a following part or a previous part of the content that is currently used in a manner that the user moves eyes for a preconfigured location only.

And, according to one embodiment, while using various display devices, a user can use content in a manner of freely switching via an eye movement.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 3A-3C are diagrams indicating a first embodiment of a method of displaying content based on a gaze location of the present specification;

FIGS. 5A-5C are diagrams indicating a third embodiment of a method of displaying content based on a gaze location of the present specification;

FIGS. 6A-6C are diagrams indicating a fourth embodiment of a method of displaying content based on a gaze location of the present specification;

FIG. 7 is a flowchart of a method of controlling a display device of the present specification; and FIG. 8 is a flowchart of a method of controlling a display device of the present specification.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present specification. Wherever possible, the same reference numbers will be used throughout the drawings to refer to the same or similar parts.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Moreover, while the embodiments have been concretely described with reference to the attached diagrams and the contents written on the diagrams, the present specification may be non-restricted or non-limited to the embodiments.

Figure 1:
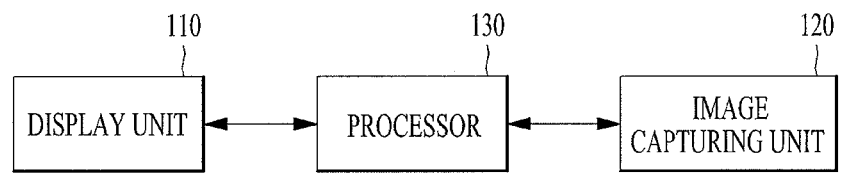
FIG. 1 is a block diagram of a display device of the present specification.

FIG. 1 is a block diagram of a display device of the present specification. More specifically, the display device 100 can include a display unit 110, an image capturing unit 120, and a processor 130.

First of all, the display device 100 can include such various digital devices capable of displaying an image as a notebook, a tablet PC, a smart phone, and the like. And, the display device 100 can include various digital devices equipped with a camera.

The display unit 110 can output an image in a display screen. And, the display unit 110 can output an image based on content executed by the processor 130 or a control command of the processor 130. For instance, the content can include various videos, an image, and the like. And, the content may correspond to book contents in the present specification.

According to the present specification, the display unit 110 can include a first display area and a second display area. The first display area and the second display area may correspond to at least a part of a display screen of the display unit 110. And, according to the present specification, the display unit 110 can display a first reading interface and a second reading interface. More specifically, the display unit 110 can display the first reading interface in the first display area and can display the second reading interface in the second display area. Regarding this, it shall be described again in FIGS. 3A-3C.

The image capturing unit 120 can capture an image. More specifically, the image capturing unit 120 can capture an image of a front direction. In this case, the front direction may correspond to a direction that the image capturing unit 120 is facing. And, the image capturing unit 120 can sense an image in an area of angle of view and can provide the image to the processor 130. In this case, the area of angle of view indicates a range of a horizontal or a vertical viewing angle capable of being included in a certain screen in case of sensing an image. And, the image capturing unit 120 can be situated at the front or rear of the display device 100.

According to the present specification, the image capturing unit 120 can sense an image of a front side of the display device 100. More specifically, the image capturing unit 120 can sense an image including a gaze location of a user facing the front side of the display device 100. And, the image capturing unit 120 can sense an image including a face direction of a user facing the front side of the display device 100. In this case, the front side of the display device 100 may correspond to a side of the display device 100 facing the user or the side at which the display unit 110 of the display device is situated.

The processor 130 can execute the content received via a data communication, the content stored in a storage unit (not depicted), or the like. And, the processor 130 controls each of units of the display device 100 and can control data transmission and reception between the units.

According to the present specification, the processor 130 can display a first reading interface in a first display area. And, according to the present specification, the processor 130 can detect a gaze location for a first point in the first display area. And, according to the present specification, if a gaze location for a second point in a second display area is detected within a predetermined time after the gaze location for the first point is detected, the processor 130 can display a second reading interface in the second display area and can display a second part of content in the second display area. Regarding this, it shall be described again in FIGS. 3A-3C.

Meanwhile, although it is not depicted in FIG. 1, the display device 100 can include a power unit, a sensor unit, a storage unit, a communication unit. The power unit (not depicted) is a power source connected to an internal battery of the display device 100 or an external power supply. The power unit can supply power to the display device 100.

The sensor unit (not depicted) detects an input signal using at least one sensor installed in the display device 100 and can deliver the input signal according to a detected result to the processor 130. And, the sensor unit (not depicted) senses various inputs of a user and an environment of the user and can deliver a sensed result to the processor 130 in order for the processor to perform an operation according to the sensed result.

The storage unit (not depicted) can store such various digital data as a video, an audio, an image, an application, and the like. The storage unit (not depicted) can store a program configured to process and control the processor 130 and can perform a function of temporarily storing input/output data. For instance, the storage unit (not depicted) can be situated at the inside of the display device 100. And, for instance, the storage unit (not depicted) can store various digital data not in the inside of the display device 100 but in an external storage unit.

The communication unit (not depicted) performs a communication with an external device using various protocols and can transceive a data using the various protocols.

In one embodiment of the present specification, operations performed by the display device 100 can be controlled by the processor 130. And, the operations of the display device 100 can be controlled by an application operated by the processor 130 in a manner of being stored in the storage unit. For clarity, these operations described in the diagrams and the following description are commonly depicted and explained like as the display device 100 performs/controls the operations.

The display device 100 depicted in FIG. 1 is a block diagram according to one embodiment. The blocks displayed in a manner of being divided indicate elements of the display device 100 in a manner of logically distinguishing the elements. Hence, the aforementioned elements of the display device 100 can be installed as a single chip or a plurality of chips according to a design of the device.

Figure 2A:
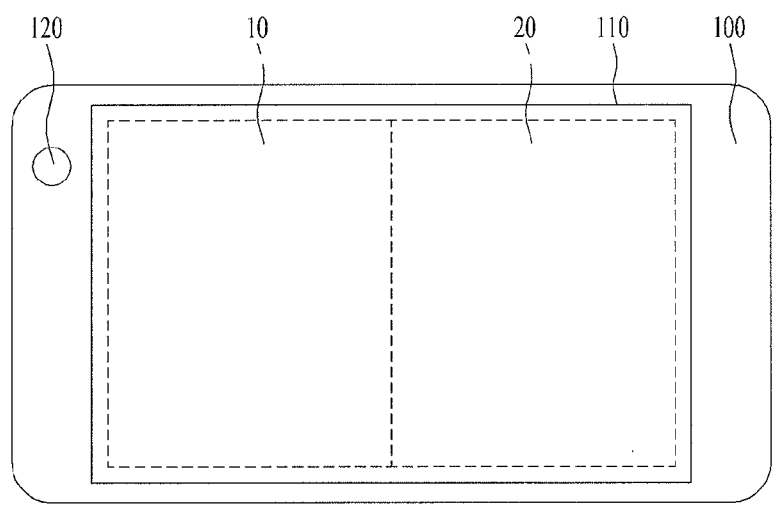
FIGS. 2A and 2B are diagrams indicating an embodiment of a display device of the present specification.
Figure 2B:
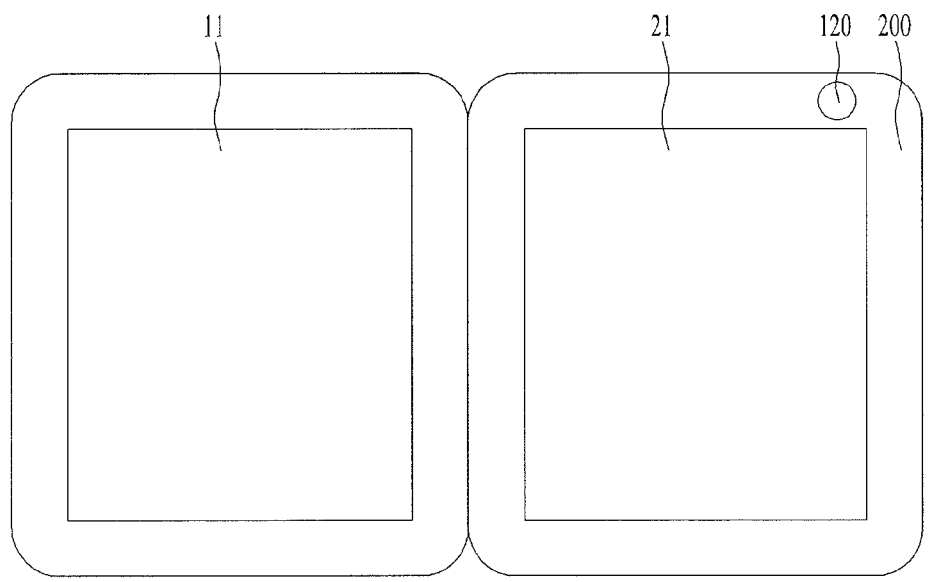

FIGS. 2A-2B are diagrams indicating an embodiment of a display device of the present specification. More specifically, FIG. 2A indicates the display device 100 including a first display area 10 and a second display area 20 and FIG. 2B indicates a display device 200 including a first display unit 11 and a second display unit 21.

As shown in FIG. 2A, the display device 100 can include one display unit 110. And, the display device 100 can include the first display area 10 and the second display area 20. Each of the first display area 10 and the second display area 20 may correspond to a part of the area of the display unit 110. For instance, referring to FIG. 2A, the first display area 10 and the second display area 20 may correspond to a half area of the display unit 110, respectively. Although it is not depicted in FIG. 2A, for instance, the display device 100 may include a third or a fourth display area as well as the first display area 10 and the second display area 20.

In one embodiment, the display device 100 can display one content using the first display area 10 and the second display area 20. More specifically, the display device can sequentially display a single content having continuity in the content using the first display area 10 and the second display area 20. In this case, the content having continuity may include document content such as an e-book. For instance, the display device 100 displays a part of content, which is a former part in order, in the first display area 10 and can display a following part of the content displayed in the first display area 10 in the second display area 20.

In another embodiment, the display device 100 can display contents different from each other in the first display area 10 and the second display area 20, respectively. For instance, the display device 100 can display document contents in the first display area 10 and can display video contents in the second display area 20. And, for instance, the display device 100 displays document contents in the first display area 10 and can deactivate the second display area 20 in a manner of not displaying any content in the second display area.

And, the display device 100 can be used as a landscape mode or a portrait mode. In this case, the landscape mode indicates a mode that the device is used in a horizontal direction. The portrait mode indicates that the device is used in a vertical direction. For instance, FIG. 2A shows a state that the display device 100 is used as the landscape mode. And, for instance, in case that the display device is used as the portrait mode, the display unit 110 can be used in a manner of being horizontally or vertically divided.

And, the display device 100 can detect a gaze location of a user using the image capturing unit 120 equipped in the device. In this case, the gaze location of a user may indicate a location of pupil of the user for the display device 100. And, the gaze location of the user may indicate a face direction of the user for the display device 100.

Referring to FIG. 2B, a display device 200 can include a first display unit 11 and a second display unit 21. In this case, the display device 200 may correspond to a foldable display device. For instance, as shown in FIG. 2B, the display device 200 can include the first display unit 11 and the second display unit 21 as a separate display unit. And, for instance, the first display unit 11 and the second display unit 21 can face from each other as a single display unit.

And, as mentioned earlier in FIG. 2A, the display device 200 can display one content using the first display unit 11 and the second display unit 21. And, as mentioned in the foregoing description, the display device 200 can display contents different from each other in the first display unit 11 and the second display unit 21, respectively.

And, although it is not depicted in FIGS. 2A and 2B, the display device 100 can include a Head Mounted Display (HMD) including the first display area and the second display area. Meanwhile, FIG. 3A to FIG. 6C shall be explained under an assumption that the display device 100 is used as the landscape mode depicted in FIG. 2A. Yet, embodiments of FIG. 3A to FIG. 6C can be identically applied to the display device 200 depicted in FIG. 2B as well.

Figure 3C:
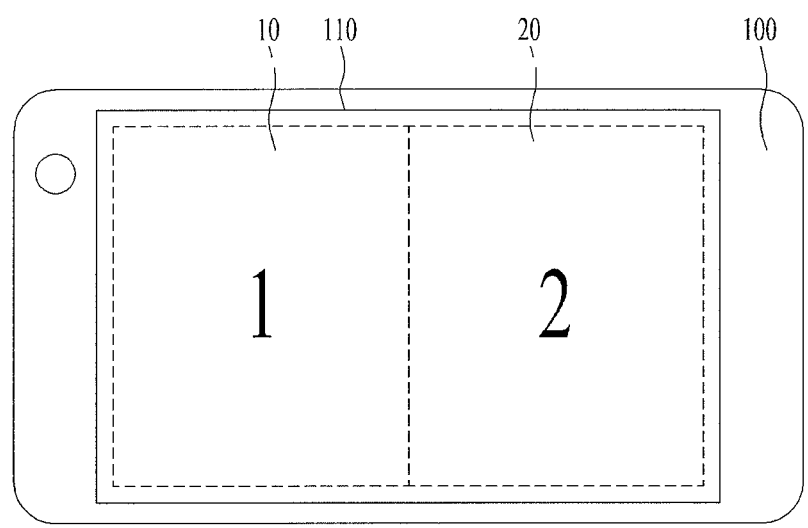
Figure 3C:
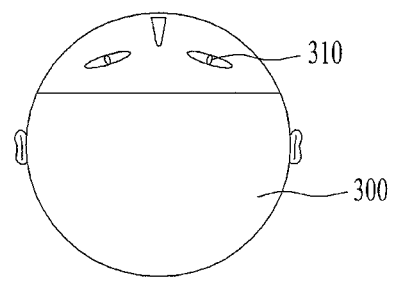

FIGS. 3A-3C are diagrams indicating a first embodiment of a method of displaying content based on a gaze location of the present specification. More specifically, FIG. 3A indicates that a gaze location of a user 300 for a first display area 10 is detected. FIG. 3B indicates that a gaze location of the user for a second display area 20 is detected. FIG. 3C indicates that content is displayed in the second display area 20.

First of all, as shown in FIG. 3A, the display device 100 can display a first reading interface in the first display area 10. In this case, the first reading interface may correspond to an interface configured to display the content related to a reading. For instance, a reading interface can include an e-book application. In this case, the display device 100 deactivates the second display area 20 or can display content different from the content displayed in the first display area 10 in the second display area 20. For instance, referring to FIG. 3A, the display device 100 can display a home screen in the second display area 20.

And, the display device 100 can display a first part 1 of the content in the first reading interface. In this case, the content displayed in the first reading interface may correspond to e-book content. And, the content displayed in the first reading interface may correspond to the content having continuity. And, the first part 1 of the content may correspond to a random part of the content. For instance, the first part 1 of the content may correspond to a first part or a middle part of the content.

Next, the display device 100 can detect a gaze location of a first point in the first display area 10. For instance, as mentioned in FIGS. 2A and 2B, the gaze location may correspond to a point to which eyes 310 of a user 300 or pupils of the user are heading for the display device 100. And, for instance, the gaze location may correspond to the point to which a face of the user 300 is heading for the display device 100.

And, the first point may correspond to a random point in the first display area 10. For instance, referring to FIG. 3A, the first point can be located at a lower part 10b of the first display area 10. Meanwhile, the display device 100 can set the first point to a specific point in the first display area 10 by a user configuration.

Next, referring to FIG. 3B, the display device 100 can detect a gaze location of a second point in the second display area. In this case, the second point may correspond to a random point in the second display area 20. For instance, referring to FIG. 3B, the second point 40 may correspond to one point located at an upper boundary part 30 in the second display area 20. And, in this case, the second point may correspond to one point of a border of the display device 100 located in the vicinity of the second display area 20, i.e., a bezel.

Meanwhile, in relation to FIG. 3B, the display device 100 can detect a gaze location of the second point in the second display area 20 within a predetermined time after the gaze location for the first point is detected. In this case, the predetermined time can be set by the user 300 or automatically. For instance, the predetermined time may correspond to 5 seconds. To detect the gaze location of the second point in the second display area 20 within the predetermined time after the gaze location of the user 300 of the first point is detected may indicate an intention of the user 300, which intends for the user to continuously use the second display area 20 after using the first display area 10.

Next, referring to FIG. 3C, the display device 100 can display a second reading interface in the second display area 20 based on the gaze location of the second point, which is detected within a predetermined time after a gaze location of the first point is detected. In particular, the display device 100 may not display a reading interface in the second display area 20 while the gaze location of the user 300 is detected in the first display area 10. In this case, the second reading interface may correspond to the interface providing content identical to the content of the aforementioned first reading interface. For instance, if e-book content is provided to the first reading interface, the display device 100 can provide the identical e-book content to the second reading interface.

And, the display device 100 can display a second part 2 of the content in the second display area 20 based on the gaze location of the second point, which is detected within the predetermined time after the gaze for the first point is detected. More specifically, the display device 100 can display the second part 2 of the content in the second display area 20 in which the second reading interface is displayed. In this case, the second part 2 may correspond to a immediately following part of the first part 1 displayed in the first display area 10. For instance, if the content is a document having no page boundary, the second part 2 may correspond to a following text of the first part 1. And, for instance, if the content is a document having the page boundary, the second part 2 may correspond to a following page of the first part 1.

According to the aforementioned embodiment, the display device 100 can move or shift a part of content not by a touch input or a gesture input for the display unit but by a change of a gaze location of a user.

Meanwhile, if a lack of a gaze for the second point in the second display area 20 is detected within the predetermined time after a gaze location of the first point is detected, the display device 100 can display the second part of the content in the first display area 10. In this case, the first point may correspond to a lower part 10b of the first display area 10. In particular, if the gaze location facing the second display area 20 is not detected for the predetermined time after the gaze location of the lower part 10b of the first display area 10 is detected, it may indicate an intention of a user 300 that the user intends to use the second part 2, which is a following part of the first part 1, in the first display area 10.

Figure 4A:
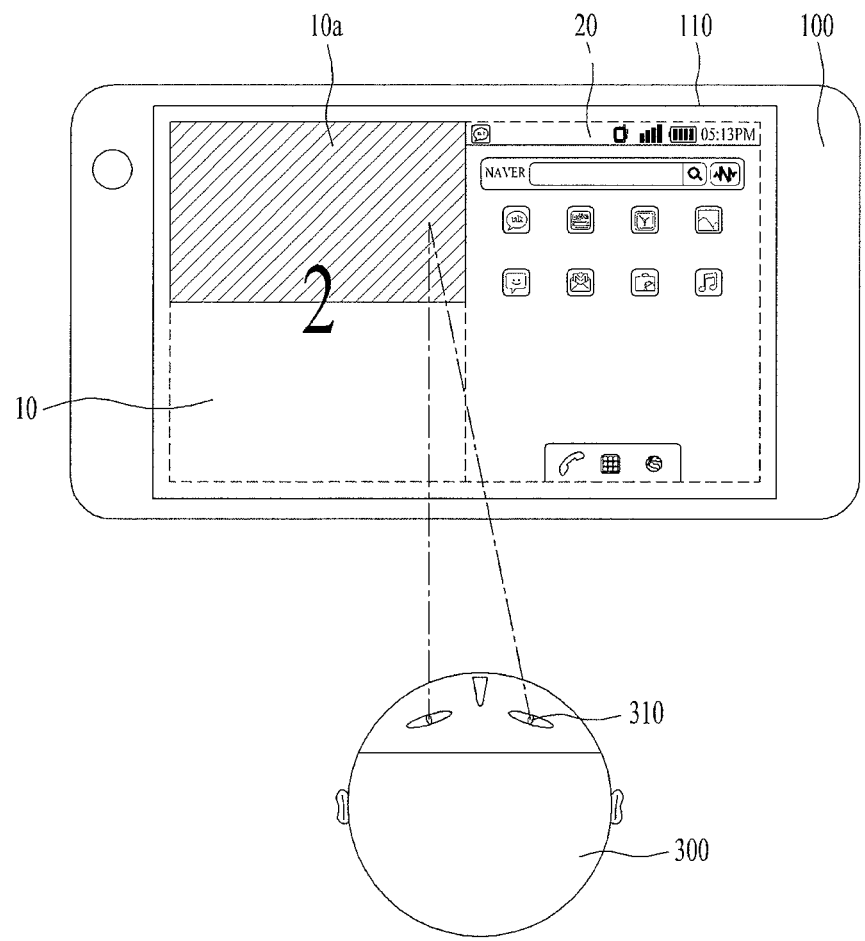
FIGS. 4A-4C are diagrams indicating a second embodiment of a method of displaying content based on a gaze location of the present specification.
Figure 4B:
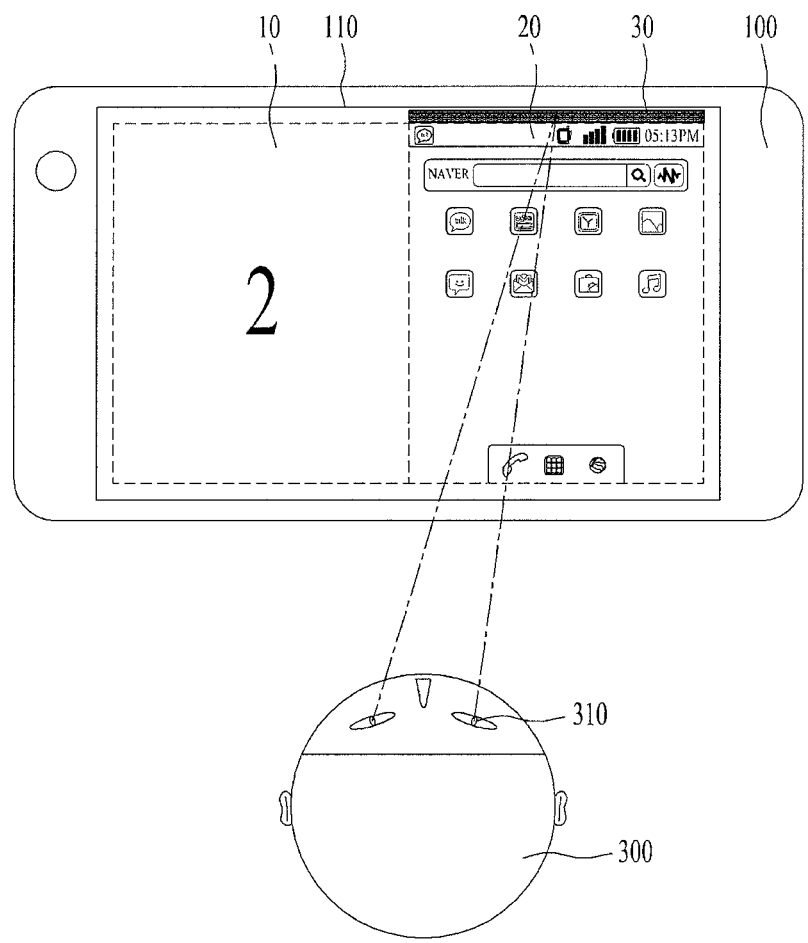
Figure 4C:
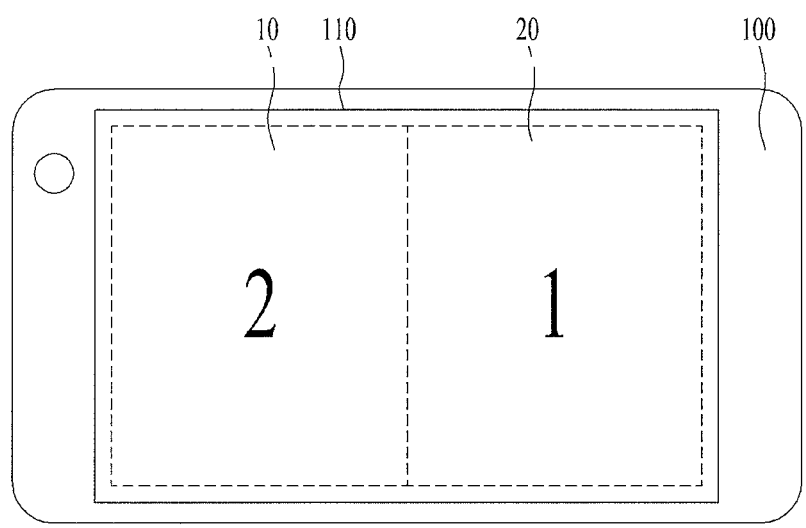
Figure 4C:
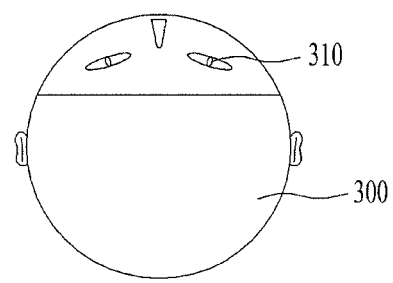

FIGS. 4A-4C are diagrams indicating a second embodiment of a method of displaying content based on a gaze location of the present specification. More specifically, FIG. 4A indicates that a gaze location of a user 300 for a first display area 10 is detected. FIG. 4B indicates that a gaze location of the user 300 for a second display area 10 is detected. FIG. 4C indicates that content is displayed in the second display area 20.

First of all, as shown in FIG. 4A, the display device 100 can display a first reading interface in the first display area. For instance, as mentioned in FIGS. 3A-3C, the first reading interface may correspond to an e-book application. And, the display device 100 can display a second part 2 of content in the first reading interface. In this case, as described in FIGS. 3A-3C, the second part 2 may correspond to a following part of a first part 1 of the content.

In this case, as mentioned in FIGS. 3A-3C, the display device 100 can display content different from the content displayed in the first display area 10 in a second display area 20. For instance, as shown in FIG. 4A, the display device 100 displays the first reading interface in the first display area 10 and the display device can display a home screen in the second display area 20.

And, as shown in FIG. 4A, the display device 100 can detect a gaze location of a first point in the first display area 10. In this case, the first point may correspond to a random area of the first display area 10. For instance, referring to FIG. 4A, the first point can be positioned at an upper part 10a of the first display area 10.

Next, referring to FIG. 4B, the display device 100 can detect a gaze location of a second point in a second display area 20. In this case, the second point may correspond to a random point in the second display area 20. For instance, referring to FIG. 4B, the second point may correspond to one point positioned at an upper boundary part 30 of the second display area 20. Meanwhile, as mentioned earlier in FIGS. 3A-3C, the display device 100 can detect a gaze location of the second point in the second display area 20 within a predetermined time after the gaze location of the first point is detected.

Next, referring to FIG. 4C, the display device 100 can display a second reading interface in the second display area 20 based on the gaze location of the second point, which is detected within the predetermined time after the gaze location of the first point is detected. In this case, the second reading interface can display content identical to the content displayed in the aforementioned first reading interface.

And, referring to FIG. 4C, the display device 100 can display a first part 1 of content in the second display area 20 based on the gaze location of the detected second point. More specifically, the display device 100 can display the first part 1 of the content in the second display area 20 in which the second reading interface is displayed. In this case, the first part 1 may correspond to a previous part of the second part 2 displayed in the first display area 10. For instance, if the content is a document having no page boundary, the first part 1 may correspond to a previous text of the second part 2. And, for instance, if the content is a document having the page boundary, the first part 1 may correspond to a previous page of the second part 2.

According to the aforementioned embodiment, the display device 100 can move or shift a part of content not by a touch input or a gesture input for the display unit but by a change of a gaze location of a user.

Meanwhile, the embodiments depicted in FIGS. 3A-3C and FIGS. 4A-4C correspond to a case that a part of the content moves in different directions according to the different gaze locations of the first point, respectively. It is also possible to perform a case opposite to the aforementioned embodiment. For instance, if a gaze location of the second point in the second display area 20 is detected within a predetermined time period after the gaze location of the lower part 10b of the first display area 10 is detected, the display device 100 can display a previous part of the content displayed in the first display area 10 in the second display area 20. And, for instance, if the gaze location of the second point in the second display area 20 is detected in a predetermined time period after the gaze location of the upper part 10a in the first display area 10 is detected, the display device 100 can display a following part of the content displayed in the first display area 10 in the second display area 20.

Although the embodiments in FIGS. 3A-3C and FIGS. 4A-4C are described based on the gaze locations of the upper part 10a and the lower part 20a of the first display area 10, the embodiments can be identically applied to a case that the gaze locations of the upper part 20a and the lower part 20a of the second display area 20 are detected as well.

Figure 5A:
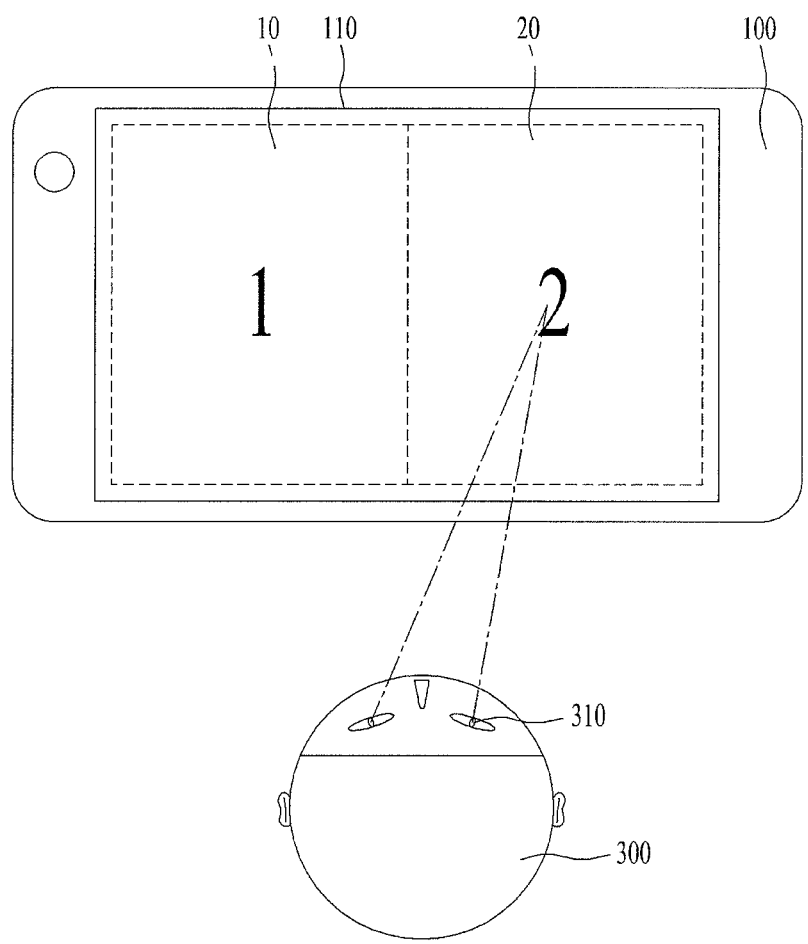
Figure 5C:
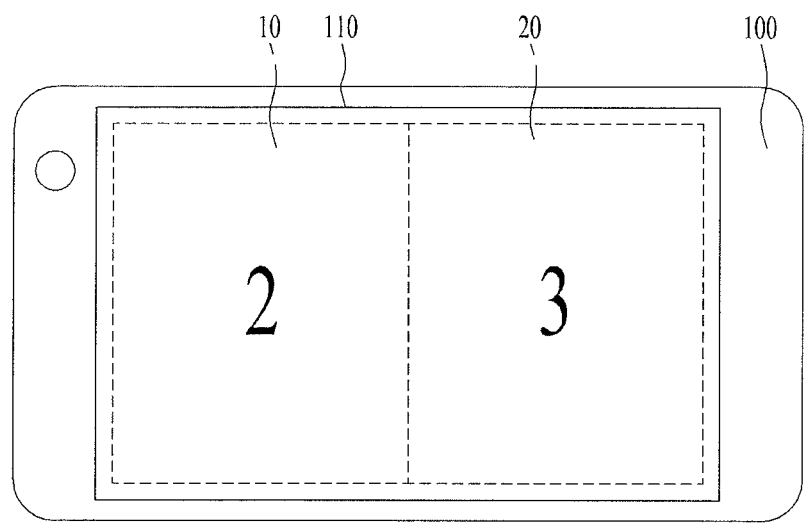
Figure 5C:
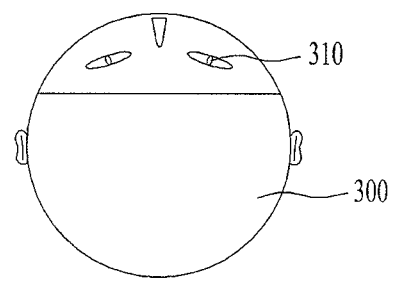

FIGS. 5A-5C are diagrams indicating a third embodiment of a method of displaying content based on a gaze location of the present specification. More specifically, FIG. 5A indicates that a gaze location of a user 300 for the second display area 20 is detected. FIG. 5B indicates that the gaze location of the user 300 for a lower part 20b of the second display area 20 is detected. FIG. 5C indicates that a following part of content is displayed in the first display area 10 and the second display area 20.

First of all, as shown in FIG. 5A, the display device 100 can display a first reading interface and a second reading interface in the first display area 10 and the second display area 20, respectively. More specifically, the display device 100 can display a first part 1 and a second part 2 in the first reading interface and the second reading interface, respectively. As mentioned earlier in FIGS. 3A-3C, the second part 2 may correspond to a following part of the first part 1 for the content displayed in the first display area 10.

In one embodiment, as mentioned earlier in FIGS. 3A-3C, the first part 1 and the second part 2 of the content depicted in FIG. 5A may correspond to a case that the second part 2 of the content is displayed in the second display area 20 after detecting a gaze location of the second display area 20, after the first part 1 of the content is displayed in the first display area 10. As a different example, the first part 1 and the second part 2 depicted in FIG. 5A may correspond to a case that the first part 1 and the second part 2 are simultaneously displayed since a reading interface is displayed in the first display area 10 and the second display area 20.

And, as shown in FIG. 5A, the display device 100 can detect a gaze location of a first point in the second display area 20. In this case, the first point may correspond to a random point in the second display area 20. By doing so, the display device 100 can recognize that the user 300 is currently using the second part 2.

Next, referring to FIG. 5B, the display device 100 can detect a gaze location of a second point 40a in the second display area 20. In this case, the second point 40a can be positioned at a left side of a lower part 20b of the second display area 20. For instance, as shown in FIG. 5B, the second point 40a may correspond to a left side of a lower boundary part of the second display area 20. In particular, the display device 100 can detect the gaze location of the second point 40a positioned at the left side of the lower part after detecting the gaze location of the user 300 for the first point positioned at a random area in the second display area 20. And, the second point 40a can be set to a specific point in the second display area 20 by a user. For instance, the second point 40a can be configured as a form of an icon image in the second display area 20.

Next, referring to FIG. 5C, the display device 100 can display a third part 3 of content in the second display area 20 based on a gaze location of the detected second point 40a. In this case, the third part 3 may correspond to a following part of the second part 2 of the content. For instance, if the content is a document having no page boundary, the third part 3 may correspond to a following text of the second part 2. And, for instance, if the content is a document having the page boundary, the third part 3 may correspond to a following page of the second part 2.

And, referring to FIG. 5C, the display device 100 can display the second part 2 of the content in the first display area 10 based on a gaze location of the detected second point 40a. In particular, the display device can display the first part 1 of the content, which is displayed in the first display area 10 before the gaze location of the second point 40a is detected, in a manner of converting into the second part 2 based on the gaze location of the detected second point 40a. This is because if the display device 100 detects the gaze location of the user 300 for the second point 40a, it can be recognized as an intention of the user 300 to convert the content displayed in both the first display area 10 and the second display area 20.

According to the aforementioned embodiment, after finishing the use of the content displayed in the display device 100, the user 300 can make the content displayed in the display unit to move a next part in a manner of gazing a specific location.

Figure 6B:
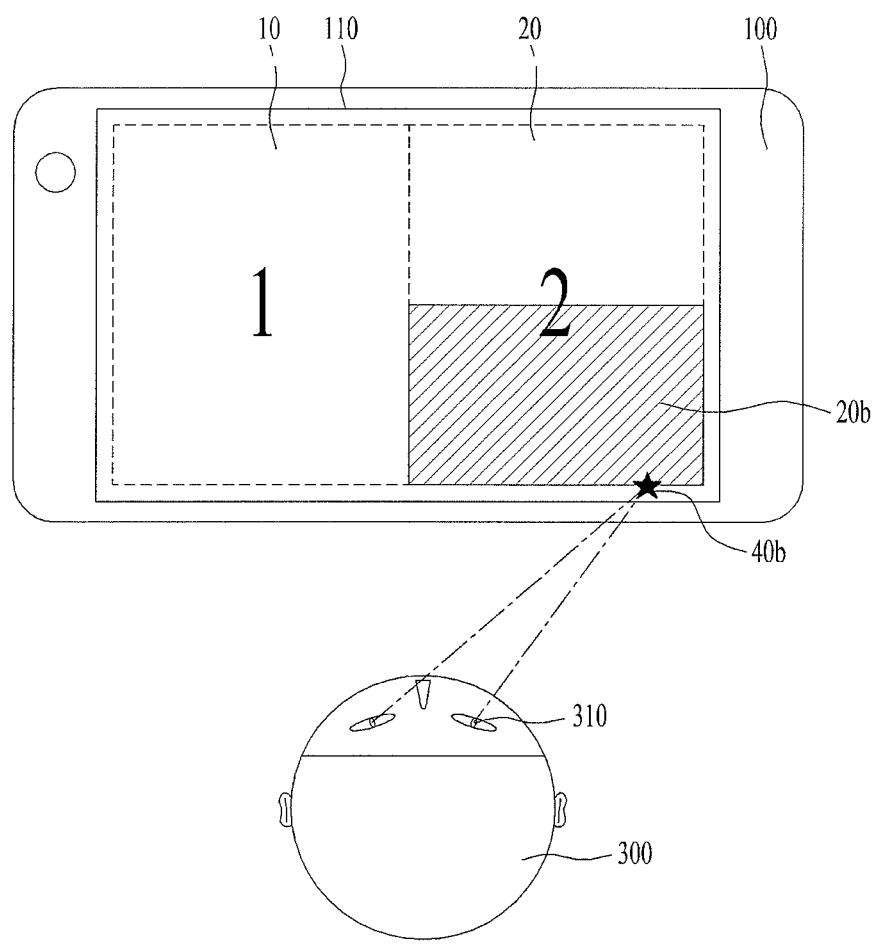
Figure 6C:
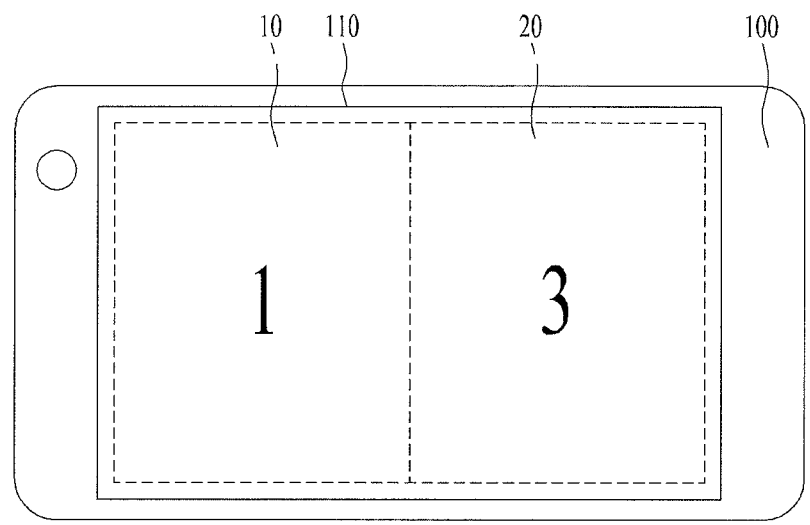
Figure 6C:
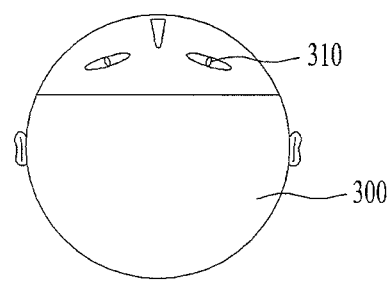

FIGS. 6A-6C are diagrams indicating a fourth embodiment of a method of displaying content based on a gaze location of the present specification. More specifically, FIG. 6A indicates that a gaze location of a user 300 for the second display area 20 is detected. FIG. 6B indicates that the gaze location of the user 300 for a lower part 20b of the second display area 20 is detected. FIG. 6C indicates that a following part of content is displayed in the second display area 20.

First of all, as shown in FIG. 6A, the display device 100 can display a first reading interface and a second reading interface in the first display area 10 and the second display area 20, respectively. As mentioned earlier in FIGS. 3A-3C, the first reading interface and the second reading interface may correspond to the interface displaying an identical content. And, as mentioned earlier in FIGS. 5A-5C, the display device 100 can display a first part 1 of content and a second part 2 of the content in the first reading interface and the second reading interface, respectively. And, as mentioned earlier in FIG. 6A, the display device 100 can detect a gaze location of a first point in the second display area 20.

Next, referring to FIG. 6B, the display device 100 can detect a gaze location of a second point 40b of the second display area 20. In this case, the second point 40b can be positioned at a lower part 20b of the second display area 20. For instance, as shown in FIG. 6B, the second point 40b may correspond to a right side of a lower boundary part of the second display area 20. And, for instance, the second point 40b can be set to a form of an icon image in a specific area of the second display area 20. And, the aforementioned second point 40a in FIG. 5B and the second point 40b in FIG. 6B can be positioned at an area different from each other.

Referring to FIG. 6C, the display device 100 can display a third part 3 of content in the second display area 20 based on a gaze location of the detected second point 40b. In this case, the third part 3 may correspond to a following part of the second part of the content.

Meanwhile, referring to FIG. 6C, the display device 100 can maintain a display for the first part 1 of the content in the first display area 10. In particular, the display device 100 can continuously display the first part of the content, which is displayed in the first display area 10 before the gaze location of the second point 40b is detected, based on the gaze location of the detected second point 40b. This is because if the display device 100 detects the gaze location of the user 300 for the second point 40b, it can be recognized as an intention of the user 300 to convert the content displayed in the second display area 20 only.

According to the aforementioned embodiment, after finishing the use of the content displayed in the display device 100, the user 300 can make the content displayed in the display unit to move a next part in a manner of gazing a specific location.

Meanwhile, the aforementioned embodiments in FIGS. 5A-5C and FIGS. 6A-6C correspond to a case that a result of conversion for content is different according to a direction of a gaze location. It is also possible to perform a content conversion on the contrary to the aforementioned embodiment. For instance, in case that a gaze location of a left side of a lower part of the second display area 20 is detected, unlike the embodiment in FIGS. 5A-5C, the display device 100 can perform a conversion for the content displayed in the second display area 20 only. And, for instance, in case that a gaze location for a right side of the lower part of the second display area 20 is detected, unlike the embodiment in FIGS. 6A-6C, the display device 100 can perform a conversion for the contents displayed in both the first display area 10 and the second display area 20.

Although FIGS. 5A-5C and FIGS. 6A-6C depict embodiments for a case that a gaze for the lower part of the second display area 20 is detected, the display device 100 can perform a content conversion identical to that in FIGS. 5A-5C and FIGS. 6A-6C even in a case that a gaze for the lower part of the first display area 10 is detected.

FIG. 7 is a flowchart of a method of controlling a display device of the present specification. Each step in FIG. 7 explained in the following description can be controlled by the processor 130 of the display device 100, which is depicted in FIG. 1.

First of all, the display device can display a first reading interface in a first display area [S710]. As depicted in FIGS. 3A-3C, the first reading interface can display a first part of content. In this case, in one embodiment, the display device can display content different from the content displayed in the first reading interface in a second display area. And, in this case, in another embodiment, the display device can deactivate the second display area.

Next, the display device can detect a gaze location of a first point of the first display area [S720]. As mentioned above in FIGS. 3A-3C, in this case, the first point may correspond to a random point in the first display area. For instance, the first point can be positioned at a lower part of the first display area. And, the first point can be set to a specific area in the first display area by a user configuration.

Next, the display device can determine whether a gaze location for a second point is detected within a predetermined time after the gaze location of the first point is detected [S730]. As mentioned above in FIGS. 3A-3C, in this case, the second point may correspond to a random point in the second display area. For instance, the second point can be positioned at an upper part of the second display area. As depicted in FIGS. 3A-3C, the second point can be positioned at an upper boundary part of the second display area.

In the step of S730, if it is determined that the gaze location for the second point is detected within the predetermined time, the display device displays a second reading interface in the second display area and can display a second part of content in the second display area [S740]. The second reading interface can display content identical to the content displayed in the first reading interface. And, the display device can display content having continuity using the first reading interface and the second reading interface.

And, as mentioned earlier in FIGS. 3A-3C, the second part may correspond to a following part of the first part. In one or more embodiments, if content corresponds to a document having a page boundary, the second part may correspond to a following page of the first part. As a different example, if content corresponds to a document having no page boundary, the second part may correspond to a following text of the first part.

FIG. 8 is a flowchart of a method of controlling a display device of the present specification. Each step in FIG. 8 explained in the following description can be controlled by the processor 130 of the display device 100, which is depicted in FIG. 1. And, detail explanation on an identical or corresponding part to the aforementioned embodiment in FIG. 7 is omitted.

First of all, the display device can display the first reading interface in the first display area [S810]. The display device can detect a gaze location of the first point of the first display area [S820]. After the gaze location of the first point is detected, the display device can determine whether a gaze signal for the second point is detected within a predetermined time [S830].

In the step of S830, if the gaze location for the second point is detected within the predetermined time, the display device displays the second reading interface in the second display area and can display the second part of content in the second display area [S840].

The display device can detect a gaze location of a third point of the second display area [S850]. As mentioned earlier in FIGS. 5A-5C and FIGS. 6A-6C, the third point may correspond to one point of a lower part of the second display area.

The display device can display a third part of content in the second display area based on a gaze location of the detected third point [S860]. As mentioned earlier in FIGS. 5A-6C, the third part may correspond to a following part of the second part of the content. As an example, if content corresponds to a document having a page boundary, the third part may correspond to a following page of the second part. As a different example, if the content corresponds to a document having no page boundary, the third part may correspond to a following text of the second part.

If the third point corresponds to a left side of the lower part of the display area, the display device can display the second part of the content in the first display area [S870]. In particular, the display device can convert the contents displayed in both the first display area and the second display area into a following part based on the gaze location of the detected third point.

And, if the third point corresponds to a right side of the lower part of the display area, the display device can maintain a display for the first part of the content in the first display area [S880]. In particular, the display device can convert the content displayed in the second display area only into a following part based on the gaze location of the detected third point.

Meanwhile, in the step of S830, if the gaze signal for the second point is not detected within the predetermined time, the display device can display the second part of the content in the first display area [S890]. As mentioned earlier in FIGS. 4A-4C, if the gaze signal for the second point is not detected within the predetermined time, the display device can recognize as if a user wants to converts the content in the first display area.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A display device and a method of controlling therefor according to the present specification may not limitedly apply to the composition and method of the aforementioned embodiments. The aforementioned embodiments may be configured in a manner of being selectively combined the whole of the embodiments or a part of the embodiments to achieve various modifications.

Meanwhile, a display device and a method of controlling therefor according to the present specification can be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, to implement in a form of a carrier wave such as a transmission via the internet and the like is also included. And, since the recording media readable by the processor are distributed to the computers connected by a network, codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on the both of the inventions can be complementarily applied, if necessary.

What is claimed is:

1. A display device, comprising
a display unit configured to display a content, the display unit comprising a first display area and a second display area;
an image capturing unit configured to capture a front image of the display device; and
a processor configured to control the display unit and the image capturing unit and detect a gaze location of a user located at a front of the display device from the captured image,
wherein the processor is further configured to:
display a first reading interface in the first display area, wherein the first reading interface displays a first part of the content,
detect a gaze location of a first point in the first display area,
when a gaze location on a second point in the second display area is detected,
display a second reading interface in the second display area and display an immediately following part of the first part of the content in the second display area if the first point is positioned in a first area of the first display area, and
display the second reading interface in the second display area and display an immediately previous part of the first part of the content in the second display area if the first point is positioned in a second area of the first display area, the second area being different from the first area.

2. The display device of claim 1, wherein the processor is further configured to display content having continuity using the first reading interface and the second reading interface.

3. The display device of claim 1, wherein the processor is further configured to display a second part of the content when a gaze location of a third point in the second display area is detected after the gaze location of the second point is detected, wherein the second part corresponds to an immediately following part of the immediately following part of the first part of the content.

4. The display device of claim 3, wherein the third point is positioned at a left side of a lower part of the second display area.

5. The display device of claim 4, wherein the processor is further configured to display the immediately following part of the first part of the content in the first display area when the gaze location of the third point in the second display area is detected after the gaze location of the second point is detected.

6. The display device of claim 3, wherein the third point is positioned at a right side of a lower part of the second display area.

7. The display device of claim 6, wherein the processor is further configured to maintain a display for the first part of the content in the first display area when the gaze location of the third point in the second display area is detected after the gaze location of the second point is detected.

8. The display device of claim 1, wherein the first reading interface and the second reading interface display a same content.

9. The display device of claim 1, wherein the processor is further configured to display content different from the content displayed in the first reading interface in the second display area when the first reading interface is displayed in the first display area.

10. The display device of claim 1, wherein the processor is further configured to deactivate the second display area when the first reading interface is displayed in the first display area.

11. The display device of claim 1, wherein the immediately following part of the first part of the content corresponds to a continuously following page of a first part displayed in a first display unit.

12. The display device of claim 1, wherein the processor is further configured to display the immediately following part of the first part of the content in the first display area when a lack of gaze of the second point is detected within the predetermined time after the gaze location of the first point is detected.

13. The display device of claim 1, wherein the first point is positioned at a lower part of the first display area.

14. The display device of claim 1, wherein the first point is positioned at an upper portion of the first display area.

15. The display device of claim 1, wherein the display device corresponds to a Head Mounted Display (HMD) containing the first display area and the second display area.

16. The display device of claim 1, wherein the display device comprises a foldable display device.

17. A method of controlling a display device, comprising the steps of:

displaying a first reading interface in a first display area, wherein the first reading interface displays a first part of content;

detecting a gaze location of a first point in the first display area;

when a gaze location on a second point in the second display area is detected, displaying a second reading interface in the second display area and displaying an immediately following part of the first part of the content in the second display area if the first point is positioned in a first area of the first display area; and displaying the second reading interface in the second display area and displaying an immediately previous part of the first part of the content in the second display area if the first point is positioned in a second area of the first display area, the second area being different from the first area.

\* \* \* \* \*